United States Patent
Gillmer et al.

[15] 3,706,991
Dec. 19, 1972

[54] COHERENT-ANGLE TRACKING SYSTEM INCORPORATING TARGET-VELOCITY TRACKING APPARATUS

[72] Inventors: Arnold H. Gillmer; Harold V. Hance, both of Los Angeles, Calif.

[73] Assignee: Hughes Aircraft Company, Culver City, Calif.

[22] Filed: April 5, 1956

[21] Appl. No.: 576,471

[52] U.S. Cl. ...........................343/7.7, 343/8, 343/9, 343/17.1
[51] Int. Cl. ................................................G01s 9/42
[58] Field of Search......................343/7.7, 8, 9, 17.1

[56] References Cited
UNITED STATES PATENTS

| | | | |
|---|---|---|---|
| 2,479,568 | 8/1949 | Hansen | 343/7.7 |
| 2,740,963 | 4/1956 | Shuler et al. | 343/17.1 |
| 2,776,425 | 1/1957 | Altman | 343/7.7 |
| 2,776,426 | 1/1957 | Altman | 343/9 |
| 2,783,465 | 2/1957 | MacNichol, Jr. | 343/7.7 |

Primary Examiner—T. H. Tubbesing
Attorney—James K. Haskell and Earnest F. Oberheim

EXEMPLARY CLAIM

4. In a moving target indicating system wherein a composite signal containing both target echo and clutter return signals is received in response to exploratory pulses radiated at a predetermined pulse repetition frequency and in which signal components are formed with the spectral distribution of the clutter and target echo signals maintained in spectral half intervals of the pulse repetition frequency comprising: means for maintaining said clutter signals at desired frequency in said half intervals; a first filter having pass band for passing one spectral half interval of the pulse repetition frequency; a second filter coupled to the output of said first filter for rejecting said spectral distribution of frequency components of said clutter return signal; an oscillator; means to frequency modulate said oscillator through a range as wide as said spectral half interval passed through said first filter; a mixer coupled to the output of said second filter and said oscillator, to shift the frequency components of said target echo signal through a range of frequencies as wide as said spectral half interval passed through said first filter; a third filter coupled to the output of said mixer having a pass band located at a predetermined frequency in said range; a frequency discriminator coupled to the output of said third filter to produce a direct current null output signal at the pass band frequency of said third filter upon the appearance of a target echo signal at the output of said third filter; means for integrating the direct current null output signal out of said frequency discriminator to produce a control signal; switching means controlled by the target echo signal at the output of said third filter to pass said control signal to said oscillator, to control the frequency output of said mixer and maintain the frequency components of said target echo signal in said pass band; and by-pass means connected to respond to the target echo signal at the output of said third filter to by-pass said second filter.

5 Claims, 5 Drawing Figures

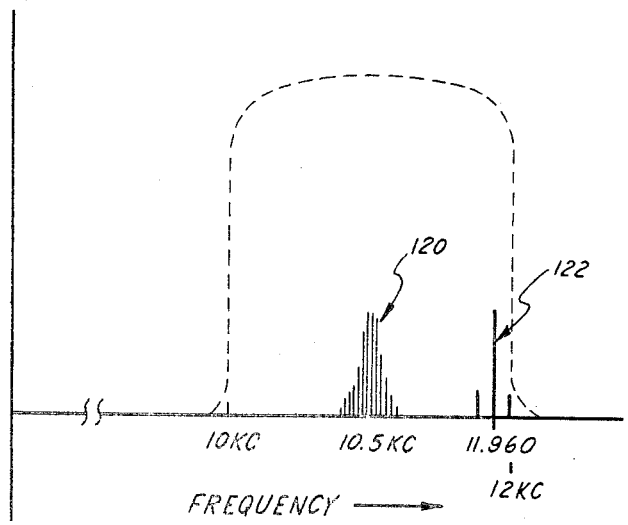
Fig. 5.
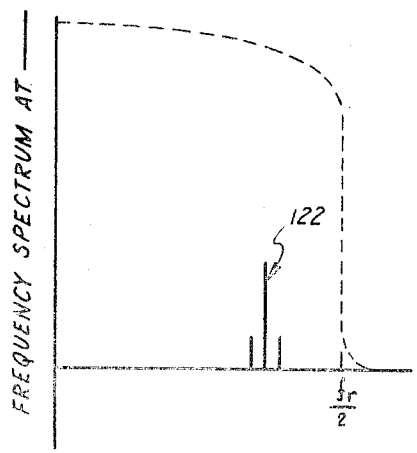
Fig. 4.
ARNOLD H. GILLMER,
HAROLD V. HANCE,
INVENTORS
ATTORNEY

COHERENT-ANGLE TRACKING SYSTEM INCORPORATING TARGET-VELOCITY TRACKING APPARATUS

This invention relates to moving-target radar apparatus and more particularly to a coherent radar system capable of both angle and velocity tracking a moving target from a moving platform wherein the return echoes from the target appear amidst signals returned from the ground in the vicinity of the target generally referred to as "clutter."

The device of the present invention is primarily adapted to operate in conjunction with the coherent-angle tracking system disclosed in a copending application for patent, Ser. No. 552,232, entitled "Coherent-Angle Tracking System" filed by Harold V. Hance and Arnold H. Gillmer on Dec. 9, 1955, now U.S. Pat. No. 3,522,604. The coherent-angle tracking system thus disclosed constituted apparatus for deriving an error signal from echo signals composed of target and clutter return signals from either a coherent or noncoherent moving-target indication (MTI) radar system.

In this system a range element including the target echo and associated clutter for exploratory pulse was obtained by means of range gating apparatus. Inasmuch as the radar system was mounted on an aircraft, the clutter return as well as the target echo signals underwent a Doppler shift in frequency due to the velocity of the aircraft. Also, over a series of range elements or samples, the amplitudes of the respective intermediate-frequency target and clutter signals were amplitude modulated in accordance with the respective Doppler frequencies and the spin frequency employed to conically scan the antenna of the radar system.

In deriving the error signal, the clutter and target return signals were added vectorially to a reference signal to convert the amplitude modulations of the clutter and target return signals into phase differences between the resulting composite signal and the reference signal. The composite signal was then phase detected with the reference signal to produce a series of pulses having amplitudes indicative of the instantaneous phases of Doppler components which varied in amplitude in accordance with the spin frequency of the antenna. The composite spectral distribution of this series of pulses comprises two series of individual spectral distributions of Doppler components within intervals which have symmetry about frequencies equal to odd multiples of one-half the pulse repetition rate of the radar system. The envelope of the overall composite spectral distributions depends, of course, on the initial duration or width of the exploratory pulses and in that it has periodic nulls occurring at intervals equal to the reciprocal of the pulse width. In operation, noise appeared on the return signal which caused its respective individual spectral distributions within each of the above intervals to be smeared over approximately 100 cycles. Also, as the aircraft is accelerated or decelerated slightly the spectral distributions shifted their position in the frequency spectrum. Hence, in order to reject the clutter signal components with its concomitant noise within a selected interval, it was first necessary that the fundamental frequency of clutter return signal remain fixed. This was accomplished by impressing the components constituting a single spectral distribution of the clutter return signal occurring within either half of the selected one of the intervals on a frequency discriminator to produce an output voltage which, in turn, was used to shift the frequency of the reference signal in a manner to maintain the smear of components constituting the spectral distribution of the clutter return signal within the afore-mentioned selected interval of frequencies centered about the frequency within the half-interval corresponding to an odd multiple of one-fourth the pulse repetition frequency. A clutter rejection filter was then used to separate the components of the clutter return signal within the half-interval from those of the target return signal. The target return signal could then be detected to produce the desired error signal for directing the antenna of the radar system continuously at the target irrespective of the presence of the clutter return signal.

The above coherent-angle tracking system was found to have certain limitations when there was radial acceleration between the aircraft and target. That is, when the radial acceleration between the aircraft and target was sufficiently high, the Doppler shift frequency changed at a rate which caused the components of the target return signal to flit completely across the above-mentioned half-interval at a rate which made AM detection of the target return signal difficult and the resulting error signal unreliable.

It is therefore an object of this invention to provide an apparatus for use in conjunction with the above coherent-angle tracking system for velocity-tracking the target whereby the components of the target return signal always appear at predetermined frequencies within each of the above-mentioned frequency intervals.

Another object of the invention is to provide an apparatus for use in conjunction with the herein described coherent-angle tracking system for shifting the frequency of the target return signal to a predetermined frequency thereby enabling a component of the target return signal with its concomitant amplitude modulations to be separated from the clutter return signal by means of an envelope-type or three-comb filter thereby to discriminate against system noise and jamming.

The coherent-angle tracking system described above provides an output signal which includes components of both the target and clutter return signals which appear within a selected half-interval of frequencies as determined in part by the pulse repetition rate. Also, the components of the clutter return signal are maintained within a predetermined portion of this selected half-interval of frequencies, thereby to enable the components of the target return signal to be rejected by means of a suitable band-elimination filter. In accordance with the present invention, during a first phase of operation the components of the target return signal remaining within the above selected half-interval of frequencies are first mixed with a sweep signal which is swept through a frequency range of a width equivalent to that of the selected half-interval of frequencies. The mixed signal is then impressed on an envelope-type filter which passes three frequencies corresponding to the carrier and the sideband components of the target return signal occurring within the shifted half-interval of frequencies.

The appearance of the target return signal components at the output of the envelope-type filter commences a second phase of operation. The frequencies of the target return signal components thus appearing at the output of the envelope-type filter are necessarily equal to the frequencies which the envelope filter is designed to pass. Apparatus responsive to the output signal from the envelope filter effects a replacement of the sweep signal being mixed with the target return signal components with a tracking signal. The frequency of the tracking signal is controlled so as to continuously shift the target return signal components to the pass-frequencies of the envelope filter. The output signal from the envelope filter may also be employed to initiate the by-passing of the afore-mentioned band-elimination filter used for rejecting the clutter return components thereby eliminating this blind-spot in the operation of the system.

The above-mentioned and other features and objects of this invention and the manner of attaining them will become more apparent by reference to the following description taken in conjunction with the accompanying drawings, wherein:

FIGS. 3, 4 and 5 represent the spectral distributions of the target and clutter return signals within a selected half-interval of frequencies at various places throughout the system.

Figure 1:
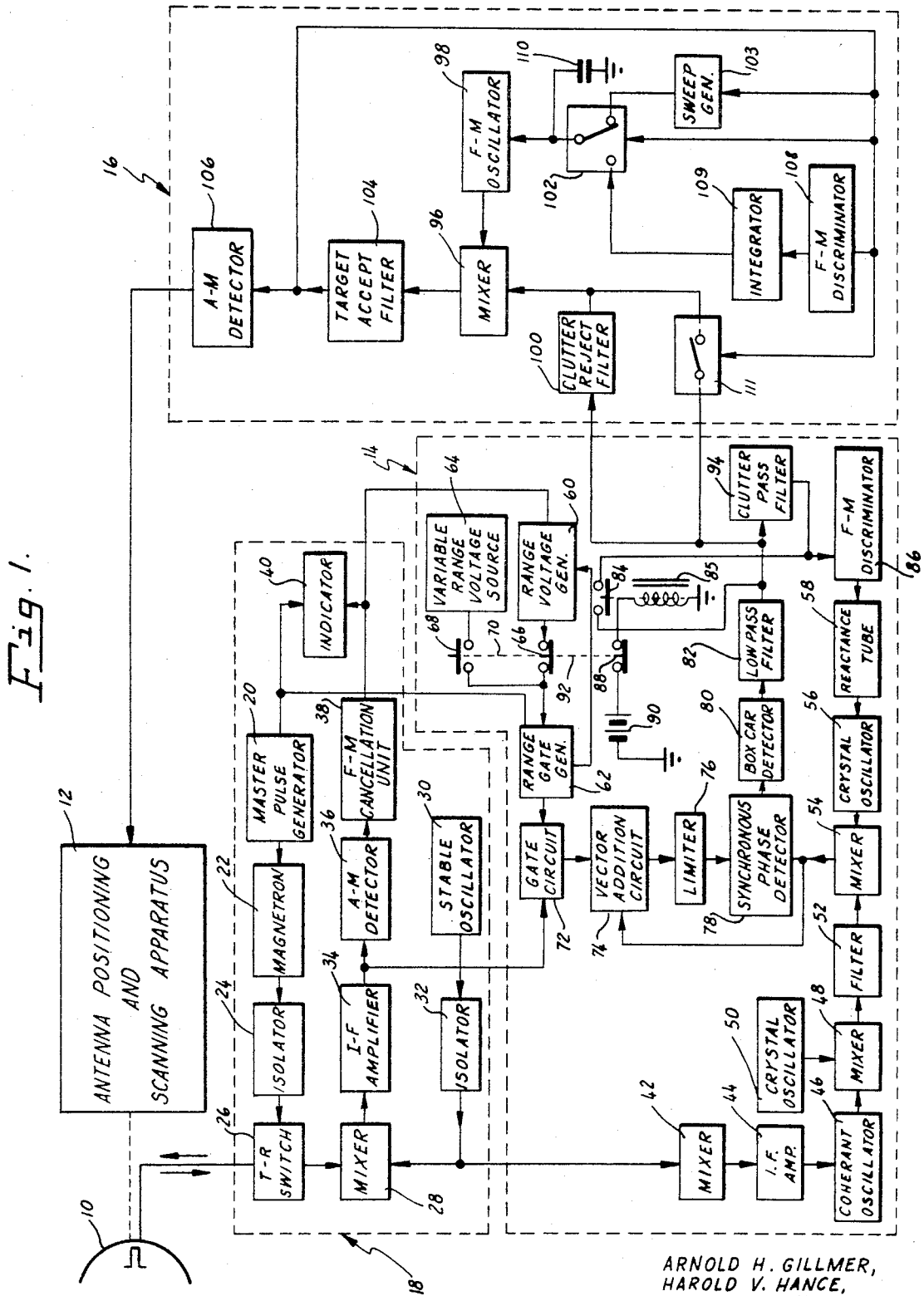
FIG. 1 is a schematic block diagram showing the device of the present invention incorporated in the afore-mentioned noncoherent search MTI radar system.

Referring now to FIG. 1, there is shown a block diagram of the coherent-angle and target-velocity tracking device of the present invention as it would be used with a noncoherent MTI search radar. This system comprises an antenna 10 which by way of example is adapted to be conically scanned, an antenna positioning and scanning apparatus 12 which is responsive to an error signal developed by a coherent Doppler angle tracking unit 14 and a target-velocity tracking unit 16 in response to input signals from a modified noncoherent search radar 18. The search radar 18, insofar as the invention is concerned, may be either coherent or noncoherent. Also, the fact that the operation of the coherent-angle tracking unit 14 and the target velocity tracking unit 16 of the present invention is described in conjunction with a noncoherent radar in the present case, is for the purposes of illustration and is not to be construed as a limitation on the scope of the application. In order to operate with the coherent-angle tracking device 14, it is necessary to modify a noncoherent search radar to the extent that the stability of certain of its operating frequencies is substantially increased over that normally required for conventional noncoherent radar systems. Accordingly, the search radar 18 comprises a master pulse generator 20 for producing pulses which may, for example, have a duration of one-quarter microsecond and a pulse-repetition frequency of 4,000 cycles per second. These pulses are employed to energize a magnetron 22 which is preferably of the tunable type. In the present case, a tuning range of from 9,280 to 9,380 megacycles per second is satisfactory. The output of the magnetron 22 is fed through an isolator 24 and is diverted by a TR switch 26 to the antenna 10 where it is radiated as a beam of electromagnetic energy thereby to provide an exploratory pulse. The isolator 24 serves to isolate the magnetron 22 from changes in impedance of the output circuit due to the conical scan of the antenna 10 and other causes.

In addition to the above, the TR switch 26 diverts signals received in response to the exploratory pulse by the antenna 10 to the receiving channel of the radar 18 which commences with a mixer 28. The local oscillations of the receiving channel are provided by a stable oscillator 30, which is tunable from 9,250 to 9,350 megacycles per second, consistent with the tuning range of magnetron 22. Also, in order to achieve the increased stability requirements for operation with the device of the present invention, it is necessary that the oscillator 30 be stable to one part in $10^8$. In order to aid in maintaining this degree of stability, the output from oscillator 30 is fed through an isolator 32 to the mixer 28 to eliminate changes in its load impedance. The output from the mixer 28 contains components which are of a frequency equal to the difference in frequency between the output signal from the stable oscillator 30 and the signals received in response to the exploratory pulses. These components are amplified by an IF (intermediate-frequency) amplifier 34 and impressed on an AM (amplitude-modulation) detector 36 to produce a signal wherein successive target indications of different amplitudes are produced by the beat between the target echo and clutter return signals due to their being shifted in frequency by different amounts by the Doppler effect. Successive sweeps of this signal from the AM detector are then cancelled by an FM (frequency-modulation) cancellation unit 38 which may be of the type described in a copending application for patent, Ser. No. 327,558, entitled "Moving Target Selector," filed by Harold V. Hance and Norman H. Enenstein on Dec. 23, 1952, and assigned to the same assignee as the present application. The output from the FM cancellation unit 38 together with synchronizing pulses from master pulse generator 20 are applied to an indicator 40 to provide a visual display.

The coherent Doppler angle tracking unit 14 and target velocity tracking unit 16 employ signals provided by the noncoherent radar 18 to effect a separation of selected components of the target return signal from the clutter return signal thereby enabling an error signal to be derived therefrom. The error signal is, in turn, employed by the antenna positioning and scanning unit 12 in directing the antenna 10 towards the target being tracked. More particularly, the tracking unit 14 comprises a linear mixer 42 which is responsive to output signals from both the magnetron 22 and the stable oscillator 30. Accordingly, a low power output signal from the magnetron 22 is provided for the mixer 42 by a connection (not shown) from between the isolator 24 and the TR switch 26 to the mixer 42, and an output signal from the stable oscillator 30 is provided by means of a connection from the output of isolator 32 to the mixer 42. The mixer 42 is adapted to develop frequency components located at the difference in frequency between the outputs from magnetron 22 and the stable oscillator 30. Thus, the output from mixer 42 is a periodic signal having a duration equal to that of the pulses employed to energize the magnetron 22 and a frequency equal to the intermediate frequency in the radar system. The output from mixer 42 is amplified by an IF amplifier 44 and impressed on a coherent oscillator 46 where it constitutes an IF locking pulse. Thus, even though the noncoherent transmitter of the MTI radar 18 is randomly phased, the coherent oscillator 46 is phase locked to the frequency of each transmitted pulse of this randomly phased transmitter so as to be capable of providing coherent video signals.

The output from the coherent oscillator 46 is in turn impressed on a mixer 48 along with a 12 megacycle signal provided by a crystal oscillator 50, thereby to shift the frequency of the output signal from the coherent oscillator by 12 megacycles. The output from mixer 48 is then fed through a filter 52 to select the desired frequency components and then impressed on an additional mixer 54. The mixer 54 mixes the signal received through filter 52 with a signal provided by a crystal oscillator 56 which has a mean frequency of oscillation of 12 megacycles and is adapted to have its frequency shifted by a reactance tube 58. Mixer 54 provides a reference signal that has a frequency, $f_{REF}$, substantially equal to the intermediate frequency of the radar 18, as determined by the frequency, $f_{COH}$, of the coherent oscillator 46, plus the deviation of frequency, $\Delta f_{COH}$, (which may be plus or minus) produced by the reactance tube 58 of the crystal oscillator 56. That is, $$f_{REF} = f_{COH} + \Delta f_{COH}$$

In addition to the signals provided by the magnetron 22 and the stable oscillator 30, the coherent Doppler angle tracking unit 14 is also responsive to the output signals from the IF amplifier 34, the FM cancellation unit 38 and to synchronizing pulses from the master pulse generator 20. More particularly, the angle tracking unit 14 includes a range voltage generator 60 which is responsive to the target indications appearing at the output of FM cancellation unit 38 and to a range gate potential produced by a range gate generator 62 for developing a voltage representative of the range of a target being tracked. The range gate generator 62 is responsive to the synchronizing pulses produced by master pulse generator 20 and to either the range voltage produced by range voltage generator 60 or a manually adjustable range voltage provided by a variable range voltage source 64. The range gate generator 62 produces the above range gate potential which is delayed by an interval of time equal to that represented by the range voltage subsequent to each pulse produced by master pulse generator 20. The range voltage applied to range gate generator 62 may, of course, be either the range voltage automatically produced by range voltage generator 60 or the manually selected range voltage provided by the variable range voltage source 64. Accordingly, range voltage generator 60 and variable range voltage source 64 are connected to the range gate generator 62 through switches 66 and 68, respectively. The switches 66, 68 are interlocked by means of a mechanical linkage 70 in such a manner that only one of the outputs from either the range voltage generator 60 or the variable range voltage source 64 may be impressed on range gate generator 62. The switches 66, 68 are shown in position for connecting the range voltage generated by range voltage generator 60 to the range gate generator 64. Thus, the range gate potentials produced by range gate generator 62 are impressed on the range voltage generator 60 where they are used in automatically generating the range voltage; on the indicator 40 in order to provide a visual indication of the position of the range gate; and on a gate circuit 72 which is coupled to the output of the IF amplifier 34.

The range gate potentials produced by the range gate generator 62 is impressed on the gate circuit 72 to pass the selected range element of the signal received by the radar 18 in response to an exploratory pulse. The actual range at which this element is taken is controlled by the range voltage from either the variable range voltage source 64 or the range voltage generator 60, depending upon the position of the switches 66, 68, i.e., whichever unit is connected to the range gate generator 62. The output from gate circuit 72 along with the reference signal provided by the mixer 54 is impressed on a vector addition circuit 74 to add the reference signal appearing at the output of mixer 54 vectorially to the signal within the selected range element appearing at the output of gate circuit 72, thereby to convert amplitude variations due to conical scanning and noise and phase modulations due to Doppler effects into phase deviations of the resultant signal from the reference signal. The composite resultant signal appearing at the output of vector addition circuit 74 is then limited by means of a limiter 76 and impressed on a synchronous phase detector 78 along with the reference signal to convert the phase deviations therebetween into a video signal which constitutes a series of pulses of amplitudes proportional to the instantaneous phase deviation. In the event that it is desired to use the frequency components of this video signal within the interval of frequencies from zero to one-half the pulse-repetition frequency, $f_r$, the power may be increased by "box-caring" with a boxcar detector 80, i.e., a detector which ideally stretches each pulse until the next pulse is received. Also, in that the output of the boxcar detector 80 does not change between successive pulses, it is evident that gating could be accomplished by controlling the instant of sampling by the boxcar detector 80, if desired. The output signals from the boxcar detector 80, however, are identical irrespective of how the gating or sampling is accomplished. The output signal from the boxcar detector 80 is then impressed on the input of a low-pass filter 82 which has a cut-off frequency, equal to $f_r/2$, where $f_r$ is the pulse-repetition frequency of the master pulse generator 20 of the radar system 18. Signals appearing at the output of the low-pass filter 82 are connected in parallel through switch contacts 84 of a solenoid relay 85 and through a clutter-pass filter 94 to an FM discriminator 86 which is tuned to produce a null output signal at one-fourth the pulse-repetition frequency, i.e., at $f_r/4$. The coil of relay 85 is connected from ground through an additional switch 88 to a battery 90 which is referenced to ground to provide a means of energizing the solenoid relay 85. The switch 88 is interlocked with the switches 66, 68 by means of an additional mechanical linkage 92 in such a manner that the switch contacts 84 remain open when the range gate generator 62 is being generated automatically. The clutter pass filter 94 will, as is evident from the drawing, be inserted between the low-pass filter 82 and the FM discriminator 86. The purpose of the clutter pass filter 94 is to prevent target return signals from being impressed on the FM discriminator 86 during the automatic phase of operation which would result in an erroneous output therefrom. This output would, in turn, be impressed on the reactance tube 58 to cause an erroneous shift in the frequency of the reference signal. As is explained in the aforementioned application for patent by Hance and Gillmer in detail, the frequency of the reference signal is continuously shifted by the operation of the reactance tube 58 in response to the output from the FM discriminator 86 so that the selected spectral distribution of components of the clutter return signal remain centered about $f_r/4$. Accordingly, the clutter pass filter 94 is of the band-pass type with a pass band of approximately 100 cycles centered about $f_r/4$.

Figure 3:
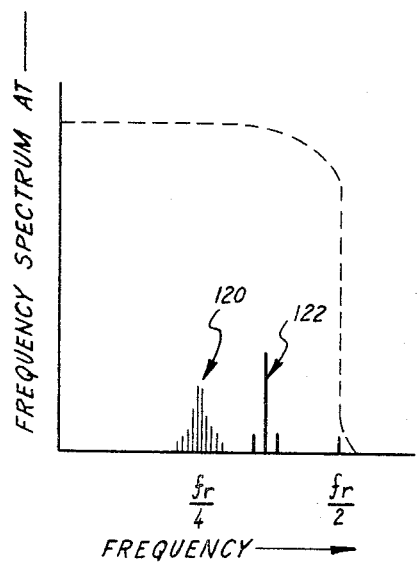

The velocity-tracking unit 16 comprises a mixer 96 for mixing signals received from an FM oscillator 98 and from the output of the low-pass filter 82. The frequency components appearing at the output of the low-pass filter 82 which passes an interval of frequencies of from 0 to $f_r/2$ comprise spectral smear 120 of clutter components and a spectral distribution 122 representative of the modulated target return signal, as shown in FIG. 3. A more detailed description of the manner in which the components 120, 122 are derived and separated is presented in the afore-mentioned application Ser. No. 552,232 filed on Dec. 9, 1955, by Harold V. Hance and Arnold H. Gillmer. A clutter reject filter 100 is initially inserted intermediate the low-pass filter 82 and the mixer 96 for separating the components 122 of the target return signal from the spectral smear 120 of components representing the clutter return signal as indicated in FIG. 4. Accordingly, the clutter reject filter 100 has an elimination band coextensive with the pass band of clutter pass filter 94 of the coherent angle-tracking unit 14, i.e., an elimination band of approximately 100 cycles centered about $f_r/4$ in the present case. In accordance with the present invention, the FM oscillator 98 is initially swept through a frequency range of a width equal to the pass-band of low-pass filter 82, i.e., equal to one-half an interval of frequencies of a width equal to the pulse repetition rate of the radar system such as, for example, from 10 to 12 kilocycles. This may be accomplished by means of a connection therefrom through a switching apparatus 102 to a sweep generator 103. The switching apparatus 102 includes the equivalent of a single-pole double-throw switch which is adapted to be switched in response to an alternating-current signal. The use of an electronic device for the switching apparatus 102 is considered to be within the scope of the teachings of this disclosure.

Figure 2:
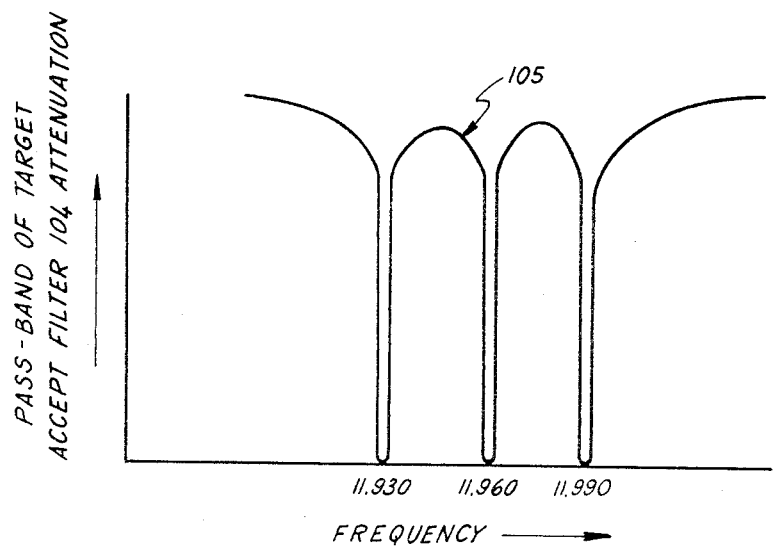
FIG. 2 illustrates the frequency-pass characteristics of an envelope-type filter.

Thus, any frequency components appearing within the ½ interval of frequencies impressed on the mixer 96 through the clutter reject filter 100 are initially shifted progressively from 10 to 12 kilocycles in frequency by mixing with the signal from the output of the FM oscillator 98. The resulting output signal from the mixer 96 is impressed on a target accept filter 104 which is adapted to pass only a single carrier frequency that is amplitude modulated at the spin frequency of the antenna 10 of the radar system 18. Thus, the target accept filter 104 is of the envelope-type and may, for example, have a pass-band characteristic such as the characteristic 105 of FIG. 2. Referring to FIG. 2, the characteristic 105 represents a suitable attenuation versus frequency characteristic for the target accept filter 104. More particularly, the target accept filter 104 is adapted to pass a carrier signal of a frequency equal, for example, to 11.960 KC. In that an error signal will appear as modulations on this carrier signal having a frequency equal to the spin-frequency of the antenna 10, i.e., 30 cycles/sec., the target accept filter 104 must allow for passage of sideband components at 11.930 and 11.990 kilocycles/sec.

Referring again to FIG. 1, the output of the target accept filter 104 is connected to an AM detector 106, an FM discriminator 108, the switching apparatus 102, and an additional switching apparatus 111 which is connected in a manner to bypass the clutter reject filter 100 in response to a signal received through the target accept filter 104. the FM discriminator 108 is tuned to produce a direct-current output having a null at the center frequency of the target accept filter 104, i.e., at 11.960 kilocycles/sec. This direct-current null signal from the discriminator 108 is impressed on an integrator 109 which, in turn, is connected through the switching apparatus 102 to the FM oscillator 98 upon the appearance of a signal at the output of the target accept filter 104. If desired, a capacitor 110 may be connected from the input of the FM oscillator 98 to a point of substantially fixed potential such as, for example, ground, to maintain the voltage impressed on the FM oscillator 98 substantially constant during the switching operation.

The appearance of the signal at the output of the target accept filter 104 energizes the switching apparatus 102 thereby switching the input of the FM oscillator 98 from the sweep generator 103 to the output of the integrator 109. In operation, any tendency of the carrier signal to deviate from the null frequency of discriminator 108 produces a direct-current error voltage which is integrated by the integrator 109 in a manner to add to or subtract from the signal impressed on the FM oscillator 98, depending on its polarity, thereby to shift the frequency of the FM oscillator 98 towards the center frequency of the target accept filter 104, i.e., 11.960 kilocycles/sec. Thus, even though the frequency of the target return signal changes due to radial acceleration between the aircraft and the target, the signal impressed on the FM oscillator 98 causes it to track the target return signal so as to always maintain the frequency of the carrier signal component of the target return signal at the center pass frequency of the target accept filter 104.

If desirable, the clutter reject filter 100 may be bypassed by the switching apparatus 111 whereby the output from the mixer 96 includes both the spectral smear 120 of components representative of the clutter return signal and the frequency components of the target return signal 122, positioned as shown in FIG. 5. The purpose of by-passing the clutter reject filter 100 is to enable the target return signal 122 to be tracked through the clutter smear 120, should circumstances permit. In that only the target return components 122 can pass through the target accept filter 104, the output from the AM detector will constitute the desired error signal. This error signal is coupled to the antenna positioning and scanning apparatus 12 for continuously directing the antenna 10 towards the target.

What is claimed is:

1. In a moving target indicating system of the character described wherein a composite signal containing both target echo and clutter return signals is received in response to exploratory pulses radiated at a predetermined pulse-repetition frequency from an antenna tracking a target and mixed with local oscillations from a stable oscillator to provide a composite intermediate-frequency signal, said system also including means for producing a reference signal of a frequency substantially equal to that of said stable oscillations and that is capable of being shifted in frequency, means for vectorially adding said intermediate-frequency signal to said reference signal to produce a resultant signal, means for generating a video signal of an amplitude representative of the phase difference between said reference and resultant signals, means for taking a sequence of samples from said video signal which include intervals concurrent in time with corresponding range elements from each sweep of said intermediate-frequency signal that include the target echo component, a first filter responsive to said sequence of samples taken from said video signal having a pass band from $n$ to $(n + 1)$ times one-half the predetermined pulse-repetition frequency of said exploratory pulses wherein $n = 0, 1, 2, 3, 4 \ldots$, means coupled to the output of said first filter for shifting the frequency of said reference signal to maintain the spectral distribution of the frequency components of said clutter return signal disposed about the mid-frequency of said pass band, and a target-velocity tracking unit, said tracking unit comprising: a second filter coupled to the output of said first filter for rejecting said spectral distribution of frequency components of said clutter return signal, means for producing oscillations which are frequency-modulated through a band of frequencies at least as wide as said pass band, a mixer coupled to the output of said second filter for mixing said frequency-modulated oscillations with the frequency components of said target echo signal remaining within said pass band thereby to periodically shift the frequency components of said target echo signal through a selected range of frequencies, a third filter coupled to the output of said mixer having a narrow pass band centered about a predetermined frequency within said selected range, a frequency discriminator coupled to the output of said third filter, said frequency discriminator being adapted to produce a direct-current null output at the center frequency of said narrow pass band, means for integrating the direct-current null-output signal from said frequency discriminator to produce a control signal, and means for replacing said frequency-modulated oscillations with oscillations of a frequency determined by said control signal upon the appearance of said target echo signal at the output of said third filter thereby to maintain the frequency components of said target echo signal centered within the narrow pass band of said third filter.

2. In a moving target indicating system as defined in claim 1 wherein said third filter is of the envelope-type adapted to pass a carrier signal and two sideband components corresponding to a frequency equal to the effective spinfrequency of the antenna.

3. In a moving target indicating system of the character described wherein a composite signal containing both target echo and clutter return signals is received in response to exploratory pulses radiated at a predetermined pulse-repetition frequency from an antenna tracking a target and mixed with local oscillations from a stable oscillator to provide a composite intermediate-frequency signal, said system also including means for producing a reference signal of a frequency substantially equal to that of said stable oscillations and that is capable of being shifted in frequency, means for vectorially adding said intermediate-frequency signal to said reference signal to produce a resultant signal, means for generating a video signal of an amplitude representative of the phase difference between said reference and resultant signals, means for taking a sequence of samples from said video signal which include intervals concurrent in time with corresponding range elements from each sweep of said intermediate-frequency signal that include the target echo component, a first filter responsive to said sequence of samples taken from said video signal having a pass band from $n$ to $(n + 1)$ times one-half the predetermined pulse-repetition frequency of said exploratory pulses wherein $n = 0, 1, 2, 3, 4 \ldots$, means coupled to the output of said first filter for shifting the frequency of said reference signal to maintain the spectral distribution of the frequency components of said clutter return signal disposed about the mid-frequency of said pass band, and a target-velocity tracking unit, said tracking unit comprising: a second filter coupled to the output of said first filter for rejecting said spectral distribution of frequency components of said clutter return signal, means for producing oscillations which are frequency-modulated through a band of frequencies at least as wide as said pass band, a mixer coupled to the output of said second filter for mixing said frequency-modulated oscillations with the frequency components of said target echo signal remaining within said pass band thereby to periodically shift the frequency components of said target echo signal through a selected range of frequencies, a third filter coupled to the output of said mixer having a narrow pass band centered about a predetermined frequency within said selected range, a frequency discriminator coupled to the output of said third filter, said frequency discriminator being adapted to produce a direct-current null output at the center frequency of said narrow pass band, means for integrating the direct-current null-output signal from said frequency discriminator to produce a control signal, and means for replacing said frequency-modulated oscillations with oscillations of a frequency determined by said control signal upon the appearance of said target echo signal at the output of said third filter thereby to maintain the frequency components of said target echo signal centered within the narrow pass band of said third filter; and additional means responsive to a signal appearing at the output of said third filter, for bypassing said second filter after said frequency-modulated oscillations have been replaced with said oscillations of a frequency determined by said control signal.

4. In a moving target indicating system wherein a composite signal containing both target echo and clutter return signals is received in response to exploratory pulses radiated at a predetermined pulse repetition frequency and in which signal components are formed with the spectral distribution of the clutter and target echo signals maintained in spectral half intervals of the pulse repetition frequency comprising: means for maintaining said clutter signals at desired frequency in said half intervals; a first filter having a pass band for passing one spectral half interval of the pulse repetition frequency; a second filter coupled to the output of said first filter for rejecting said spectral distribution of frequency components of said clutter return signal; an oscillator; means to frequency modulate said oscillator through a range as wide as said spectral half interval passed through said first filter; a mixer coupled to the output of said second filter and said oscillator, to shift the frequency components of said target echo signal through a range of frequencies as wide as said spectral half interval passed through said first filter; a third filter coupled to the output of said mixer having a pass band located at a predetermined frequency in said range; a frequency discriminator coupled to the output of said third filter to produce a direct current null output signal at the pass band frequency of said third filter upon the appearance of a target echo signal at the output of said third filter; means for integrating the direct current null output signal out of said frequency discriminator to produce a control signal; switching means controlled by the target echo signal at the output of said third filter to pass said control signal to said oscillator, to control the frequency output of said mixer and maintain the frequency components of said target echo signal in said pass band; and by-pass means connected to respond to the target echo signal at the output of said third filter to by-pass said second filter.

5. In a moving target indicating system wherein an antenna follows a moving target in response to an antenna positioning and scanning apparatus comprising: search radar means to receive clutter and target echo signals from said moving target; coherent Doppler angle tracking means connected to said search radar means to produce signal components of a target echo signal, and of the clutter return signal located at the center of a fixed frequency band width; a first filter means to eject said clutter signals at the center frequency of the fixed band width; a second filter means with a desired pass band in said fixed frequency band width to pass the target echo signal from said first filter; a mixer connected between said first and said second filter; an oscillator connected to said mixer to shift the frequencies of said signal components when passing from said first filter to said second filter; a switch with a first, second and third input and with its output connected to control the frequency of said oscillator; a sweep generator connected to said first input of said switch to provide frequency modulation of said oscillator; discriminator and signal forming means connected to said second input of said switch to form a control signal upon the appearance of said target echo signals at the output of said second filter; said third input of said switch connected to the output of said second filter to pass said control signal through said switch to said oscillator to disconnect said sweep generator to maintain the frequency of said oscillator upon the appearance of said target echo signals at the output of said second filter; by-pass means connected between said coherent Doppler angle tracking means and said mixer to by-pass said first filter in response to target echo signals at the output of said second filter; and detector means connected between the output of said second filter and said antenna positioning and scanning apparatus to control said antenna in response to said target echo signal.

* * * * *